US008150623B2

(12) United States Patent
Bitar et al.

(10) Patent No.: US 8,150,623 B2
(45) Date of Patent: Apr. 3, 2012

(54) MANUAL SELECTION OF THE ACTIVE REFERENCE OF A FLIGHT PLAN FOR THE GUIDANCE OF AN AIRCRAFT

(75) Inventors: Elias Bitar, Tournefeuille (FR); Christophe Caillaud, Blagnac (FR)

(73) Assignee: Thales (FR)

( * ) Notice: Subject to any disclaimer, the term of this patent is extended or adjusted under 35 U.S.C. 154(b) by 807 days.

(21) Appl. No.: 12/272,271

(22) Filed: Nov. 17, 2008

(65) Prior Publication Data

US 2009/0157237 A1 Jun. 18, 2009

(30) Foreign Application Priority Data

Dec. 7, 2007 (FR) ...................................... 07 08555

(51) Int. Cl.
G01C 21/00 (2006.01)
G05D 1/10 (2006.01)
(52) U.S. Cl. .......................................... 701/467; 701/16
(58) Field of Classification Search .................... 701/3
See application file for complete search history.

(56) References Cited

U.S. PATENT DOCUMENTS

| 4,692,869 | A | * | 9/1987 | King et al. ..................... 701/206 |
| 5,842,142 | A | * | 11/1998 | Murray et al. ................... 701/16 |
| 6,112,141 | A | * | 8/2000 | Briffe et al. ..................... 701/14 |
| 6,246,957 | B1 | * | 6/2001 | Barrer et al. .................... 701/202 |
| 6,405,124 | B1 | * | 6/2002 | Hutton ........................... 701/200 |
| 6,571,171 | B1 | * | 5/2003 | Pauly ............................. 701/206 |
| 6,922,631 | B1 | * | 7/2005 | Dwyer et al. .................... 701/206 |
| 7,024,287 | B2 | * | 4/2006 | Peckham et al. ................... 701/3 |
| 7,385,527 | B1 | * | 6/2008 | Clavier et al. ................... 340/945 |
| 2002/0065586 | A1 | * | 5/2002 | Sample ............................. 701/3 |
| 2005/0137758 | A1 | * | 6/2005 | He et al. ........................... 701/3 |
| 2005/0234608 | A1 | | 10/2005 | Jaillant |
| 2006/0025899 | A1 | * | 2/2006 | Peckham et al. ................... 701/3 |
| 2007/0050098 | A1 | | 3/2007 | Caillaud |
| 2007/0129857 | A1 | | 6/2007 | Fortier |
| 2007/0208465 | A1 | * | 9/2007 | Gremmert ......................... 701/4 |
| 2007/0225876 | A1 | | 9/2007 | Caillaud et al. |
| 2007/0233331 | A1 | | 10/2007 | Caillaud |
| 2007/0276553 | A1 | | 11/2007 | Bitar et al. |
| 2008/0039984 | A1 | | 2/2008 | Bitar et al. |
| 2008/0046171 | A1 | | 2/2008 | Bitar et al. |
| 2008/0059058 | A1 | * | 3/2008 | Caillaud et al. ............... 701/206 |
| 2008/0154490 | A1 | | 6/2008 | Hoofed et al. |
| 2008/0183343 | A1 | * | 7/2008 | Brent et al. ....................... 701/3 |

FOREIGN PATENT DOCUMENTS

FR 2905480 A 3/2008
WO 2005012837 A1 2/2005

OTHER PUBLICATIONS

U.S. Appl. No. 12/096,548, filed on Nov. 14, 2006 Not Yet Published.
U.S. Appl. No. 12/094,656, filed on Nov. 16, 2006 Not Yet Published.
U.S. Appl. No. 12/208,460, filed on Sep. 11, 2008 Not Yet Published.

* cited by examiner

*Primary Examiner* — Shelley Chen
(74) *Attorney, Agent, or Firm* — Lowe Hauptman Ham & Berner, LLP

(57) ABSTRACT

The present invention relates to a method allowing a modification of the flight plan of an aircraft in a semi-automated manner. The invention presents the main advantage of affording the crew of an aircraft a method for aiding the rejoining of a flight plan requiring only a designation by an operator of the new active reference that he wishes to use for guiding the aircraft.

21 Claims, 6 Drawing Sheets

| | | | |
|---|---|---|---|
| ALPHA | 12:31 | 213 | 2000 |
| BRAVO | 12:34 | 213 | 2000 |
| CHARLIE | 12:37 | 187 | 1500 |
| DELTA | 12: | | 500 |
| RW31 | 12: | | 200 |

--- END OF FLIGHT PLAN ---

KPDX  12:40  145KTS  31NM

FIG. 5b

MANUAL SELECTION OF THE ACTIVE REFERENCE OF A FLIGHT PLAN FOR THE GUIDANCE OF AN AIRCRAFT

RELATED APPLICATION

The present application is based on, and claims priority from, French Application Number 07 08555, filed Dec. 7, 2007, the disclosure of which is hereby incorporated by reference herein in its entirety.

TECHNICAL FIELD

The present invention relates to a method allowing a modification of the flight plan of an aircraft in a semi-automated manner. More precisely, the method according to the present invention allows the pilot of an aircraft to manually designate in his flight plan the new active reference to be used for the guidance of the said aircraft, this designation being of such a nature as to give rise to a modification of the flight plan of the aircraft.

BACKGROUND OF THE INVENTION

For twenty-five years, automation has been playing a continually bigger part in avionics, both civil and military, so that crews are required to make ever more use of electronic systems, and have ever less direct influence on the aircraft's primary flight controls. This trend has been further accentuated over the last fifteen years with the generalization in aircraft of the flight management systems, commonly designated by the term FMS (for Flight Management System).

A flight management system consists of various functional components which allow the crew to programme a flight on the basis of a navigation database. The crew provides it with a flight plan, which consists of a set of waypoints linked by segments or "legs". The system calculates a lateral and vertical trajectory making it possible to follow the flight plan, on the basis of the characteristics of the aeroplane, the data provided by the crew and the environment of the system. The positioning and guidance functions then collaborate to aid the aircraft to remain on this trajectory.

Functions for interfacing with the crew and with the ground allow the human to intervene in the navigation loop since he alone is responsible for the progress of the flight.

It frequently happens that an aircraft deviates temporarily from its flight plan, for example on instruction from an air traffic controller during an approach phase before landing. To return to their flight plan, the crew of the aircraft must define the new active reference, that is to say for example the new current leg, called the "active leg", or the new point from which the aircraft comes, called the "From waypoint", of the flight plan and then update the flight plan so as to render it consistent and so that the flight management system can recalculate a trajectory. The term "active reference" is known and designates the current reference used for the guidance of the aircraft.

When a member of the crew wishes to designate a new active reference to the flight management system, he has two tools at his disposal:
   the direct rejoining of a waypoint, designated in the flight plan, with the aid of a function of the "Direct to" type, as it is known;
   the erasure of the From waypoint.

In the first case, he modifies the structure of his flight plan by creating a new leg between the position of his aeroplane and the selected point.

In the second case, he must perform multiple manipulations for erasing the origin point of the active leg. This operation is known as manual sequencing of the flight plan.

The most operationally acceptable procedure is to choose a radial interception towards the point that one wishes to home in on, while preserving the course of the original leg. But this operation is not very simple since it demands particular attention and it modifies the nature of the leg leading to the point that the operator wishes to home in on.

To summarize, currently, the modification of the flight plan and/or the rejoining of the latter when the aircraft has deviated therefrom requires the operator, knowing the capabilities of the flight management system, to undertake a cognitive effort or a significant workload in order to carry out this task of designating the active reference of the flight plan.

French patent application No. 0706471 may be cited as a method for aiding navigation aimed at facilitating the manual sequencing of a flight plan. This method in fact proposes a semi-automatic function for sequencing the flight plan. It applies in the case where an aircraft has deviated from its flight plan for any reason and when the crew wishes at a given moment to rejoin their original flight plan. According to this method, the flight management system must anticipate the trajectory for rejoining the flight plan and prompt the pilot by proposing the waypoint towards which the aircraft ought to steer. The pilot may or may not consent to this proposal. However, according to this invention, the sequencing of the flight plan is not carried out automatically by the flight management system.

So, no method exists today making it possible to relieve the operator of a significant workload demanding real cognitive effort when he wishes to reintegrate a flight plan, at the level of a waypoint or a leg of his choice. This operation is nevertheless frequently useful, notably when an aircraft deviates from its flight plan for any reason, for example when an air traffic controller asks it to divert during an airport approach phase.

An aim of the invention is thus to allow the crew of an aircraft to designate in an explicit manner the active reference of the flight plan, that is to say for example the leg or the origin point of the legthat they wish to see become active.

SUMMARY OF THE INVENTION

For this purpose, the subject of the invention is a flight plan modification method intended for managing the flight of an aircraft, the aircraft possessing a flight management system furnished with a flight plan comprising waypoints and with an original trajectory consisting of legs and transitions between legs calculated in such a way that the trajectory passes as close as possible to the said waypoints of the flight plan and that the aircraft is able to follow the said trajectory, an active reference, which may be the active leg, that is to say flown by the aircraft, or the From waypoint of the aircraft, being defined at each instant, characterized in that it comprises, at a given instant, a step of manually selecting the active reference used for guiding the aircraft.

Advantageously, the method furthermore comprises a step of calculating a new trajectory starting from the aircraft.

Advantageously, the method comprises a step of automatically deleting the waypoints of the flight plan preceding the manually selected active reference.

Advantageously, the new trajectory is calculated automatically by the flight management system.

Advantageously, in the case where the flight management system manages a log listing waypoints of the flight plan through which the aircraft has already passed, the method according to the invention comprises a step of automatically updating the log of the flight plan, so that notably it is consistent with the manually selected active reference.

In an exemplary implementation, the manually selected active reference is a waypoint of the flight plan designated as the From waypoint of the aircraft.

In an exemplary implementation, the method according to the invention comprises a step of inserting a waypoint positioned before the point designated as From waypoint of the aircraft, so as to define with it a new leg, the said inserted waypoint being able to be moved so as to optimize an angle of capture of the leg whose origin is the From waypoint of the aircraft designated previously.

In another exemplary implementation, the manually selected active reference is a leg of the flight plan designated as active leg.

Advantageously, the step of calculating a new trajectory comprises the preservation of the transition preceding the active leg.

In an exemplary implementation, the method according to the invention comprises a step of inserting a waypoint positioned before the leg designated as active leg, so as to define with the origin of the said active leg a new leg, the said inserted waypoint being able to be moved so as to optimize an angle of capture of the active leg designated previously.

Advantageously, the method for managing the flight of an aircraft according to the invention can be applied to a phase of approach to an airport by the said aircraft.

A flight management system of an aircraft can implement the method according to the invention, and comprise a man-machine interface presenting information relating to the flight plan to the crew of the aircraft, the said man-machine interface comprising means for selecting the active reference used for guiding the aircraft.

For example, a flight management system of an aircraft comprising a man-machine interface presenting the crew with information relating to the flight plan, including the list of waypoints of the said flight plan, can implement the method according to the invention, the man-machine interface comprising means for selecting a waypoint of the flight plan, and for displaying a contextual menu comprising a function for designating the waypoint selected as new From waypoint of the aircraft.

In another exemplary application, a flight management system of an aircraft comprising a man-machine interface presenting the crew with information relating to the flight plan, including the list of legs of the said flight plan, can implement the method according to the invention, the man-machine interface comprising means for selecting a leg of the flight plan, and for displaying a contextual menu comprising a function for designating the leg selected as new active leg flown by the aircraft.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 5b: a second exemplary man-machine interface allowing the application by a crew of the method according to the invention.

DETAILED DESCRIPTION OF THE INVENTION

The figures which follow are concerned with presenting examples of applying the method of flight plan modification and/or rejoining according to the invention, in the particular case of an aircraft 1 which has deviated from its flight plan in an airport approach phase, for example on the request of the air traffic controller. By definition, other cases of application exist.

Figure 1:
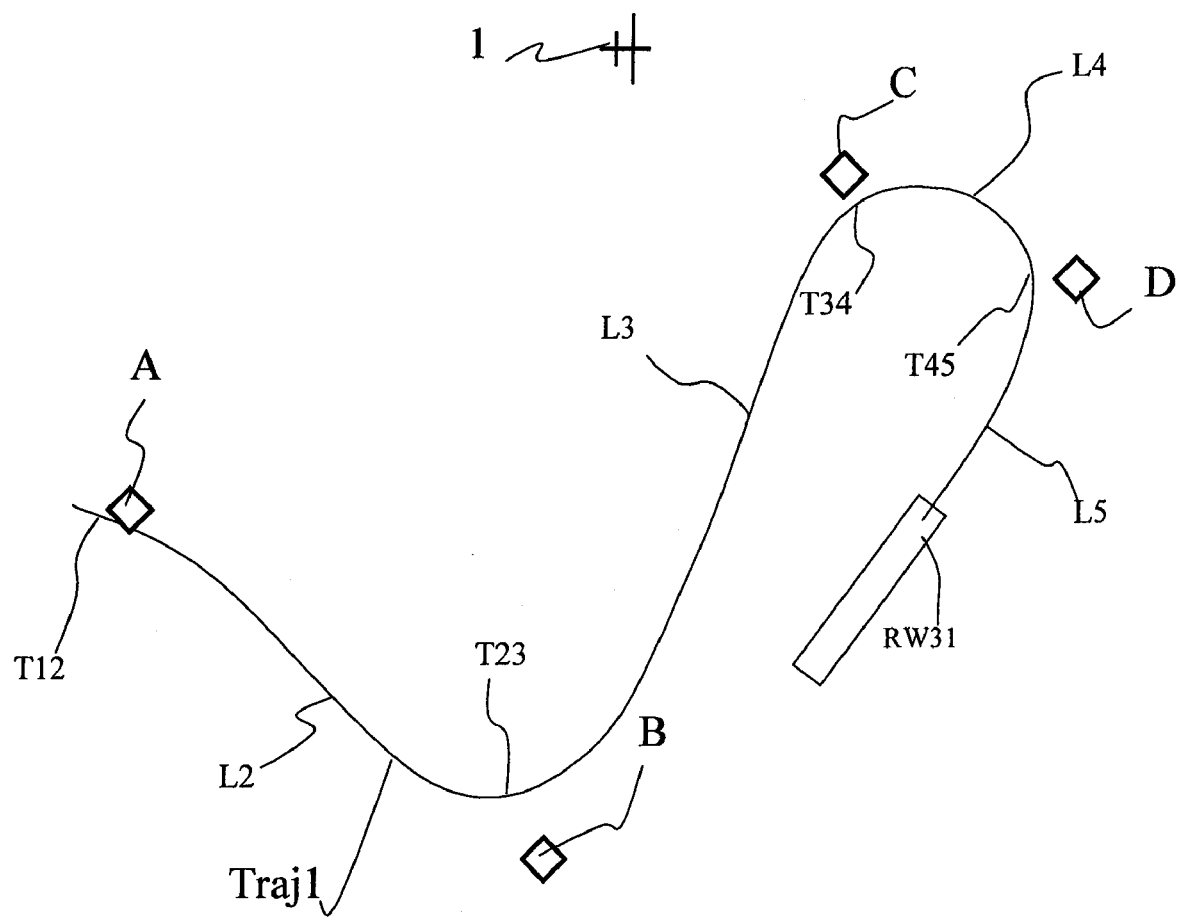
FIG. 1: the diagram of a flight plan and of an approach trajectory ending up at a landing runway.

FIG. 1 presents a diagram of a flight plan extract comprising waypoints A, B, C and D. The trajectory Traj1 is calculated by the flight management system so as to pass as close as possible to these waypoints A, B, C, D. It comprises four legs L2, L3, L4, L5 and transitions between legs, designated by the labels T12, T23, T34 and T45, again calculated by the flight management system, so that it is possible for an aircraft to follow the trajectory Traj1 as closely as possible. Additionally, considered here is an aircraft 1 with a flight management system such as described above, that has calculated the trajectory Traj1 and possesses in memory the entirety of the flight plan.

This trajectory extract Traj1 constitutes an approach phase intended to end with a landing on the runway RW31. It is considered by way of example that the aircraft 1 assumed to follow this trajectory Traj1 has to deviate therefrom for some reason, for example on command of the control tower with a view to regulating the air traffic in the environs of the airport. The crew wishes, when they are given authorization, to rejoin their trajectory with a view to landing at the conclusion of the leg L5.

The aircraft 1, having deviated from its original trajectory Traj1, may not have passed through one or more waypoints of the flight plan, thereby preventing the flight management system with which it is equipped from ensuring aid to the guidance and to the tracking of the trajectory. As regards the reference leg for guiding the aircraft 1, the flight management system in fact remains a priori "locked" at the level of the last waypoint consented to by the aircraft 1.

It is up to the crew to choose the waypoint or the leg at which the aircraft 1 must rejoin its original flight plan, either in a totally autonomous manner, or aided in its choice by a module of the flight management system. The operator's decision inevitably gives rise to the designation of the new active reference. The expression "active reference" is understood to mean the active, that is to say current, element of the flight plan. It may be a leg of the flight plan: in this case, the trajectory calculated will tend to follow this leg, defined as current or active leg, as closely as possible. It may involve designating the active waypoint, From waypoint, or the "To waypoint", which is the next waypoint.

Figure 2:
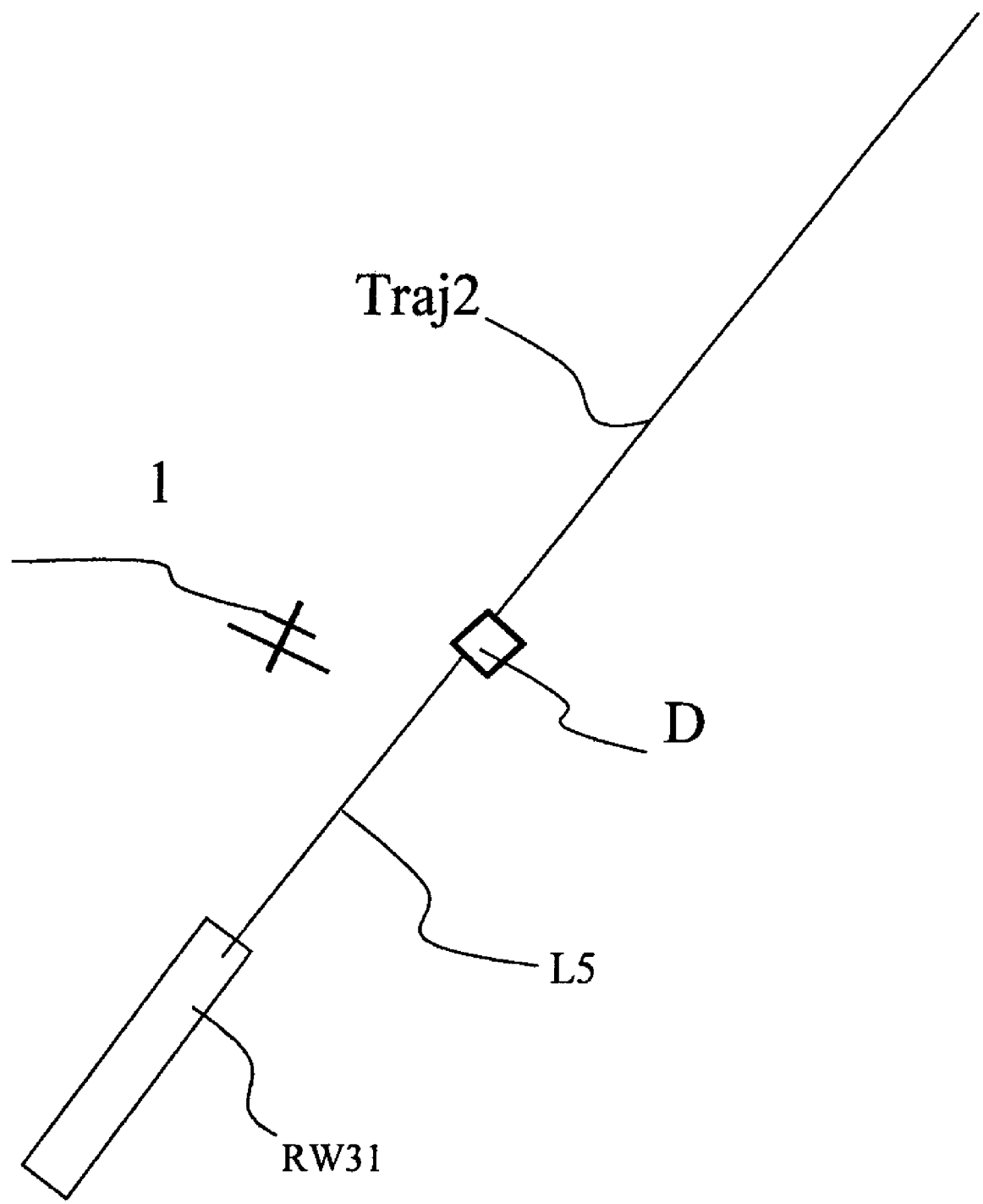
FIG. 2: the illustration of a first exemplary application of the method according to the invention, consisting in designating a waypoint as active reference by way of From waypoint of the aircraft.

FIG. 2 therefore presents the case where the operator designates the waypoint D as new active reference for guiding the aircraft 1 by way of designating the From waypoint of the said aircraft 1. Preferably, all the waypoints of the flight plan, including A, B, C, preceding the point D are automatically erased from the flight plan. A new trajectory, Traj2 is automatically calculated and the log of the flight, which lists the waypoints through which the aircraft 1 has passed, is updated.

The flight management system will consequently ensure guidance of the aircraft 1 aimed at making it follow the leg L5 as closely as possible.

For the pilot the only manipulation consists in designating a point of the flight plan intended to become the new From waypoint of the aircraft 1. This designation is entirely intuitive, and the irksome manipulations of manual sequencing of the flight plan disappear.

Figure 3:
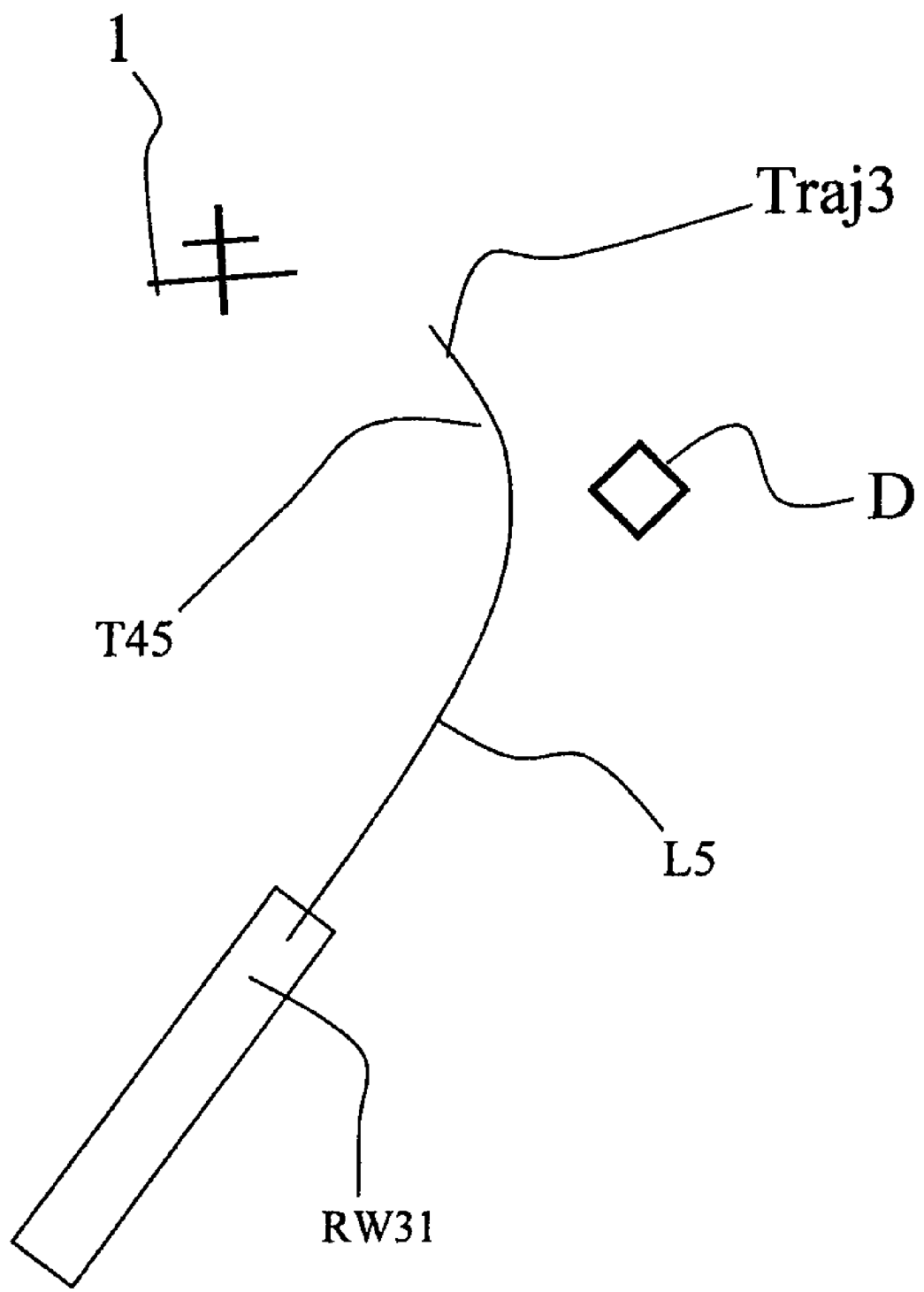
FIG. 3: the illustration of a second exemplary application of the method according to the invention, where a leg of the flight plan is designated as active reference by way of active leg flown by the aircraft.

FIG. 3 represents a second case of applying the method according to the invention. This time, the operator designates the leg that he wishes to see become active. Here, it is the leg L5 which is chosen as active leg. In this case, the transition T45 which precedes the leg chosen as active leg is preserved. The route followed by the aircraft 1 to rejoin the leg L5 is different from that followed in FIG. 2. The guidance of the aircraft 1, proposed by the flight management system, will therefore consist in following as closely as possible the trajectory Traj3 comprising the transition T45 and the leg L5 so as to end up at the landing runway RW31.

The remainder is identical to the description of FIG. 2, that is to say the waypoints A, B, C preceding the new active reference used for guidance, namely the leg L5, are automatically deleted from the flight plan and the new trajectory Traj3 is calculated by the flight management system. The single manipulation required in respect of the crew is again simple and intuitive.

Figure 4:
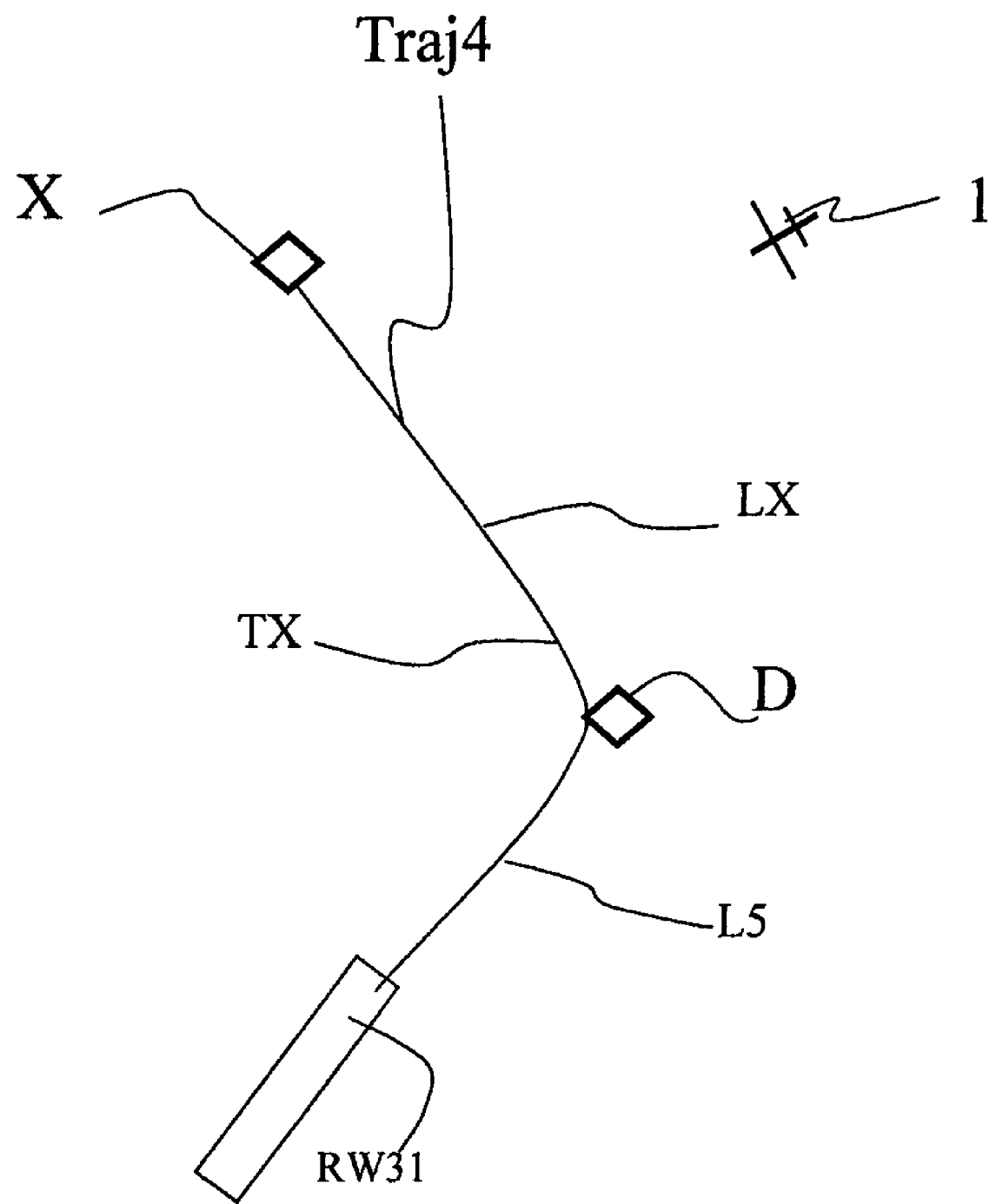
FIG. 4: the illustration of a third exemplary application of the method according to the invention in which a waypoint is inserted before the manually designated active reference, making it possible to adjust the angle of capture of the next active leg.

FIG. 4 presents a third exemplary implementation of the method according to the invention, which constitutes a development of the first case of application, mentioned in FIG. 2. The operator, having decided to rejoin the original flight plan by choosing the waypoint D as new active reference by way of From waypoint, has the possibility of inserting a new waypoint X into the flight plan, preceding the point D. The waypoints X and D thus define a new leg LX.

In this way, the new trajectory Traj4 calculated by the flight management system and taking into account the waypoints X and D leading to the landing runway RW31 can be adjusted: by inserting the point X, then by moving it as he pleases, the operator can in fact select an angle of capture of the leg L5, the calculated trajectory Traj4 also comprising a transition TX. This is particularly useful in the case, corresponding to the example of the various figures, where the leg L5 is the last leg before the landing runway RW31 since the pilot has the possibility of choosing the angle of capture of the latter leg L5.

Additionally, as in the other cases, the method does not demand any additional workload from the operator. Thereafter the log can be updated automatically and the new trajectory Traj4 recalculated by the flight management system.

Figure 5A:
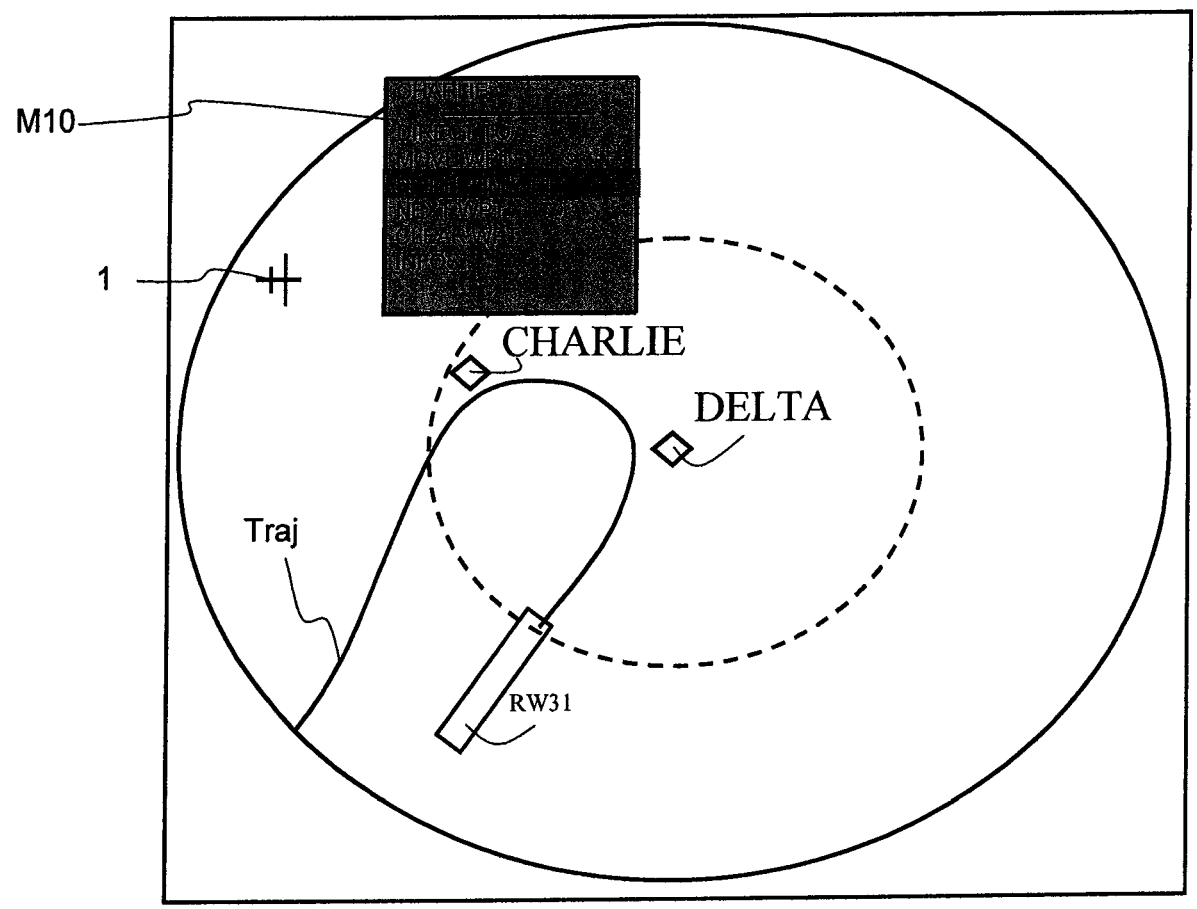
FIG. 5a: a first exemplary man-machine interface allowing the application by a crew of the method according to the invention.

FIGS. 5a and 5b present two examples of man-machine interfaces, MMI, allowing the crew of an aircraft to decide to implement the method according to the invention.

In the MMI presented in FIG. 5a, the operator views the trajectory in two dimensions with the trajectory Traj, the precalculated theoretical trajectory from which the aeroplane 1, also represented, has deviated. The last two waypoints, CHARLIE and DELTA, corresponding to the points C and D of the previous diagrams, are also represented, as is the landing runway RW31. The operator has the possibility of selecting a waypoint of the flight plan, for example here the point CHARLIE, and of displaying a contextual menu M10 corresponding to this point CHARLIE. Conventional trajectory management functions are then accessible:

the DIRECT TO function to rejoin the point CHARLIE in a direct line,
the MOVE WPT function to move the waypoint CHARLIE,
the NEXT WPT function to go to the contextual menu of the next waypoint,
the CLEAR WPT function to erase the point CHARLIE,
the INFOS function to display the information relating to the point CHARLIE (altitude, speed, . . . etc.).

Additionally, a new function is also available: entitled SET FROM WPT, it makes it possible to designate the point CHARLIE as new FROM waypoint in accordance with the previously described method according to the invention.

FIG. 5b presents an MMI making it possible to carry out the same operation as the MMI of FIG. 5a. This time, the information presented to the operator consists of a list M21 of waypoints, ALPHA, BRAVO, CHARLIE and DELTA supplemented with the mention of the landing runway RW31, all associated with various parameters. Just as for FIG. 5a, it is possible to select a waypoint, for example the point CHARLIE, and to display a contextual menu M20 associated therewith. It is thus possible to define, with the aid of the SET FROM WPT function, the waypoint CHARLIE selected as new From waypoint of the aircraft.

In an entirely similar manner, it is possible to use an MMI comprising a contextual menu displayable on selecting a leg of the flight plan. This contextual menu includes a SET ACTIVE LEG function which makes it possible to define the leg selected as new active leg, and therefore as active reference of the flight plan.

To summarize, the invention presents the main advantage of providing the crew of an aircraft 1 with a semi-automatic method for rejoining a flight plan requiring only a designation by an operator of the new active reference that he wishes to use for guiding the aircraft 1. This active reference having been designated, typically by means of a man-machine interface, the waypoints preceding it in the flight plan are automatically erased while a new trajectory is calculated by the flight management system, and the log can also be updated automatically.

By virtue of this method, the workload related to the manual sequencing of the flight plan is eliminated and the workload and the cognitive effort that are put in by the crew are therefore reduced when an aircraft seeks to rejoin its flight plan after having deviated from it. This can be particularly useful in an approach and landing phase during which a diversion of the aircraft might have been requested by the air traffic control, all the more so since the workload of the crew during this phase is already very high, even when there is no diversion.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. Method for managing the flight plan intended for managing the flight of an aircraft, the aircraft possessing a flight management system furnished with a flight plan comprising waypoints and with an original trajectory consisting of legs and of transitions between legs calculated in such a way that the trajectory passes as close as possible to the said waypoints of the flight plan and that the aircraft is able to follow the said trajectory, an active reference, which may be the active leg, that is to say flown by the aircraft, or the From waypoint of the aircraft, being defined at each instant, comprising a step of manually selecting the active reference used for guiding the aircraft.

2. Method for managing the flight plan according to claim 1, comprising a step of calculating a new trajectory starting from the aircraft.

3. Method for managing the flight plan according to claim 1, comprising a step of automatically deleting the waypoints of the flight plan preceding the manually selected active reference.

4. Method for managing the flight plan according to claim 1, wherein the new trajectory is calculated automatically by the flight management system.

5. Method for managing the flight plan according to claim 3, wherein the new trajectory is calculated automatically by the flight management system.

6. Method for managing the flight plan according to claim 1, the flight management system additionally managing a log listing waypoints of the flight plan through which the aircraft has already passed, comprising a step of automatically updating the log of the flight plan, so that notably it is consistent with the manually selected active reference.

7. Method for managing the flight plan according to claim 1, wherein the manually selected active reference is a waypoint of the flight plan designated as the From waypoint of the aircraft.

8. Method for managing the flight plan according to claim 5, wherein the manually selected active reference is a waypoint of the flight plan designated as the From waypoint of the aircraft.

9. Method for managing the flight plan according to claim 7, comprising a step of inserting a waypoint positioned before the point designated as From waypoint of the aircraft, so as to define with it a new leg, the said inserted waypoint being able to be moved so as to optimize an angle of capture of the leg whose origin is the From waypoint of the aircraft designated previously.

10. Method for managing the flight plan according to claim 8, comprising a step of inserting a waypoint positioned before the point designated as From waypoint of the aircraft, so as to define with it a new leg, the said inserted waypoint being able to be moved so as to optimize an angle of capture of the leg whose origin is the From waypoint of the aircraft designated previously.

11. Method for managing the flight plan according to claim 1, wherein the manually selected active reference is a leg of the flight plan designated as active leg.

12. Method for managing the flight plan according to claim 5, wherein the manually selected active reference is a leg of the flight plan designated as active leg.

13. Method for managing the flight plan according to claim 11, wherein the step of calculating a new trajectory comprises the preservation of the transition preceding the active leg.

14. Method for managing the flight plan according to claim 12, wherein the step of calculating a new trajectory comprises the preservation of the transition preceding the active leg.

15. Method for managing the flight plan according to claim 11, comprising a step of inserting a waypoint positioned before the leg designated as active leg, so as to define with the origin of the said active leg a new leg, the said inserted waypoint being able to be moved so as optimize an angle of capture of the active leg designated previously.

16. Method for managing the flight plan according to claim 12, comprising a step of inserting a waypoint positioned before the leg designated as active leg, so as to define with the origin of the said active leg a new leg, the said inserted waypoint being able to be moved so as to optimize an angle of capture of the active leg designated previously.

17. Application of a method for managing the flight of an aircraft according to claim 1 to a phase of approach to an airport by the said aircraft.

18. Flight management system of an aircraft implementing the method according to claim 1 and comprising a man-machine interface presenting information relating to the flight plan to the crew of the aircraft, the said man-machine interface comprises means for selecting the active reference used for guiding the aircraft.

19. Flight management system of an aircraft implementing the method according to claim 5 and comprising a man-machine interface presenting information relating to the flight plan to the crew of the aircraft, wherein the said man-machine interface comprises means for selecting the active reference used for guiding the aircraft.

20. Flight management system of an aircraft according to claim 18, the information relating to the flight plan comprising the list of the waypoints of the said flight plan, wherein the man-machine interface comprises means for selecting a waypoint of the flight plan, and for displaying a contextual menu comprising a function for designating the waypoint selected as new From waypoint of the aircraft.

21. Flight management system of an aircraft according to claim 18, the information relating to the flight plan comprising the list of the legs of the said flight plan, wherein the man-machine interface comprises means for selecting a leg of the flight plan, and for displaying a contextual menu comprising a function for designating the leg selected as new active leg flown by aircraft.

* * * * *